INVENTORS.
EDMUND S. CHAMBERS
ALPER A. GARREN
DEAN O. KIPPENHAN
WILLIAM A. S. LAMB
ROBERT J. RIDDELL, JR.

BY

ATTORNEY.

Jan. 5, 1960    E. S. CHAMBERS ET AL    2,920,236
APPARATUS FOR HEATING IONS
Filed April 24, 1959    2 Sheets-Sheet 2

INVENTORS.
EDMUND S. CHAMBERS
ALPER A. GARREN
DEAN O. KIPPENHAN
WILLIAM A. S. LAMB
ROBERT J. RIDDELL, JR.

ATTORNEY.

United States Patent Office 2,920,236
Patented Jan. 5, 1960

2,920,236

APPARATUS FOR HEATING IONS

Edmund S. Chambers, Walnut Creek, Alper A. Garren, Berkeley, Dean O. Kippenhan, Castro Valley, and William A. S. Lamb and Robert J. Riddell, Jr., Berkeley, Calif., assignors to the United States of America as represented by the United States Atomic Energy Commission Application April 24, 1959, Serial No. 808,858

5 Claims. (Cl. 315—111)

The present invention relates generally to the heating of materials in the gaseous state, and more particularly to apparatus for heating ions in a plasma to extremely high temperatures.

Various apparatus is well known for raising materials in the gaseous state to extremely high temperatures or energies. These high temperatures are valuable for the initiation of various nuclear and chemical reactions between the gaseous constituents which would not otherwise occur at lower temperatures, as well as for thermonuclear purposes. This arises as regards chemical reactions since, as is generally accepted, the speed of reaction approximately doubles for each rise in temperature of 10 degrees centigrade. The production of very high temperatures in gaseous material is also utilized in high temperature spectroscopy which can be an extremely valuable tool, both in basic research and in the control of industrial processes. The energetic particles obtained in the raising of gaseous material to extremely high temperatures may also be widely employed for injection into various particle accelerators or other charged particle utilization apparatus.

One device for obtaining extremely high temperatures and which accomplishes various of the results noted hereinbefore is disclosed in U.S. Patent No. 2,728,877 to Fischer. The apparatus of Fischer, however, produces extremely high temperatures of only very short time duration, i.e., pulses of heat are produced. Inasmuch as the gaseous material necessarily cools between pulses, a more intense heating effect and other advantages are gained by the provision of means for continuously heating the gaseous material. Prominent among existing apparatus for continuously heating gaseous material are various gaseous discharge devices wherein the gaseous material is ionized and the resulting plasma is confined by a magnetic field serving as a non-material containment medium while the plasma ions are heated by the application of a radio frequency field transversely to the magnetic field. The radio frequency field is generally generated at the gyromagnetic (Larmor) frequency of the plasma ions so as to impart rotational energy thereto in a cumulative manner each half cycle of the field. The radio frequency field has been directly generated by means of radio frequency energized transversely spaced electrodes as well as induced azimuthally by means of a solenoid energized with radio frequency current to establish a radio frequency magnetic field parallel to the magnetic confinement field. The foregoing means employed to generate a radio frequency field have resulted in a relatively small amount of energy transfer to the plasma ions, far less than that theoretically possible. Such reduced transfer of energy in prior devices is principally due to the inefficient coupling of radio frequency energy to the field generating means employed therein and polarization of the plasma which minimizes the penetration of the radio frequency field into the plasma.

The present invention overcomes the foregoing difficulties and limitations by providing improved apparatus for the radio frequency energization or heating of plasma ions in far greater proportions than has been heretofore realizable.

It is an object of the present invention to provide apparatus for the transfer of radio frequency energy to the ions of a magnetically confined plasma with the utmost of efficiency.

Another object of the invention is to suppress polarization in a magnetically confined plasma normal to an induced radio frequency electric field so that the field significantly penetrates the plasma.

Still another object of the invention is to provide improved cyclotron resonance heating apparatus wherein lamellar electric fields are eliminated in the heating zone.

It is a further object of the present invention to provide energetic charged particles for introduction to charged particle utilizing equipment such as particle acceleration apparatus and the like.

The invention both as to its organization and method of operation, together with further objects and advantages thereof, will best be understood by reference to the following specification taken in conjunction with the accompanying drawing, of which:

Figure 1:
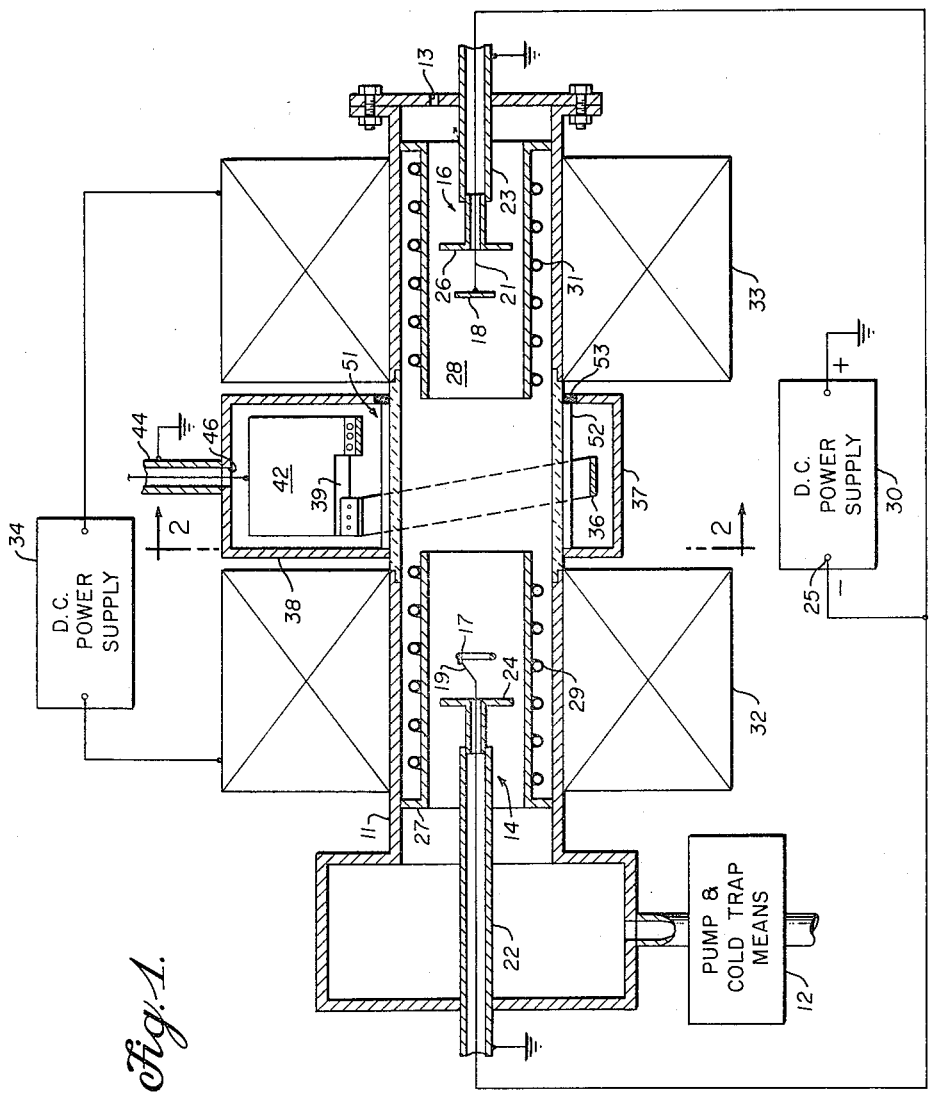
Figure 1 is a cross-sectional elevation view of a preferred embodiment of the invention.
Figure 2:
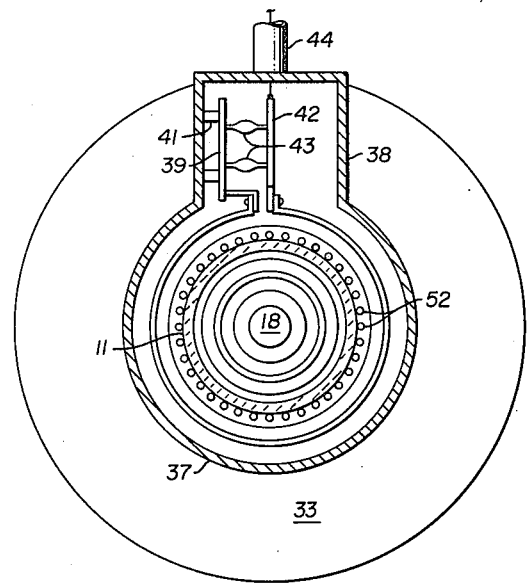
Figure 2 is a section view of this embodiment taken along the line 2—2 of Figure 1.

Considering now the ion heating apparatus of the present invention and referring to Fig. 1 of the drawing, there will be seen to be provided an elongated vacuum envelope 11 of preferably cylindrical configuration and at least the central portion of which is of insulating material. In order to evacuate the envelope 11 to suitable vacuum dimension, e.g., of the order of $10^{-5}$ mm. of mercury, conventional vacuum pump and cold trap means 12 are communicably coupled thereto preferably at one end. To the end of introducing gaseous material to be heated to the envelope, a leak 13 or other inlet means is provided at the other end of envelope 11 for pressure sealed connection to a source or sources (not shown) of such material. The pump means 12 may, accordingly, be continuously operated to maintain pressure in the system with a constant flow of gaseous material therethrough.

The gaseous material within envelope 11 is ionized in an electrical discharge as established between a pair of longitudinally spaced high voltage electrodes 14, 16 disposed in the opposite end regions of the envelope. Preferred structure of electrodes 14, 16 respectively includes a ring cathode 17 and a disc cathode 18 transversely disposed longitudinally inward from the envelope end closures with at least the disc cathode 18 being fabricated from field emissive material, such as aluminum. Cathodes 17, 18 are supported in position by connection to rigid lead-in conductors 19, 21 respectively insulatedly sealed coaxially within electrically conducting sleeves 22, 23 which extend axially outward through the envelope end closures in pressure sealed relation thereto. The inner ends of sleeves 22, 23 respectively terminate longitudinally outward from cathodes 17, 18 and plates 24, 26 are secured transversely to the sleeve ends in longitudinal spaced relation to the cathodes. The plates 24, 26 are of a substantially greater diameter than that of the cathodes and such plates function in a manner which is subsequently described to suppress radial polarization of a plasma. The cathodes 17, 18 are both maintained at the same negative potential by external connection of lead-in conductors 19, 21 to the negative terminal 25 of a direct current power supply 30, the positive terminal of which is connected to ground. Sleeves 22, 23 are also connected to ground to thereby in turn ground the suppressor plates 24, 26.

The electrodes 14, 16 in accordance with the present invention further respectively include electrically conducting tubular members 27, 28 coaxially secured within the end regions of envelope 11 and extending longitudinally inward therefrom in encompassing relation to cathodes 17, 18 and plates 24, 26. Cooling coils 29, 31 are concentrically secured about the members 27, 28 and coolant is circulated therethrough in the conventional manner from a coolant source (not shown). The cooled members 27, 28 hence prevent excessive heating of the electrode structure.

An axially symmetric magnetic field is provided longitudinally through envelope 11 which cooperates with the electrodes 14, 16 in the establishment of the electrical discharge as well as serves to axially and radially confine the resulting plasma. More particularly, a pair of longitudinally spaced solenoids 32, 33 are respectively concentrically disposed about the end regions of envelope 11 with the transverse median planes thereof respectively interposed between suppressor plate 24 and cathode 17, and between suppressor plate 26 and cathode 18. Solenoids 32, 33 are series connected and energized by a direct current power supply 34 coupled therebetween. The energized solenoids 32, 33 thus establish an axially symmetric magnetic field longitudinally through envelope 11 with the field having gradientially intensified reflector field regions situated proximate the solenoids. The reflector field regions have a peak strength substantially at the transverse median planes of solenoids 32, 33, respectively. The reflector field regions decrease in strength longitudinally inward from the planes of peak strength to terminate in a substantially uniform central field region of lesser intensity disposed therebetween. The magnetic field in combination with the cathodes 17, 18 hence comprise means for establishing a reflex or PIG type discharge within envelope 11 in a substantially conventional manner. The field in accordance with the present invention, however, is modified from the uniform magnetic field conventionally employed in reflex discharge devices by the reflector field regions which effect axial confinement of the resulting plasma within substantially the central field region of lesser strength.

As regards more particularly the reflex discharge, electrons are initially provided by field emission from cathode 18 and such electrons in colliding with molecules of the gaseous material introduced to envelope 11 through leak 13 produce ions and additional electrons. The electrons are repelled from cathode 18 longitudinally through envelope 11 toward cathode 17 and such electrons are tightly bound by the longitudinally extending magnetic field lines. Upon approaching the cathode 17, a substantial portion of the electrons is repelled back toward cathode 18 and hence the electrons in general reflex back and forth between the cathodes in the conventional manner. The ionization of the gaseous molecules by collisions with the reflexing electrons becomes cumulative and an intense gaseous discharge is established longitudinally within envelope 11, i.e., a longitudinal column of plasma is produced. The plasma column is radially and axially constrained within the central region of the magnetic field with the attractive force of cathodes 17, 18 to the plasma ions being overcome by the reflective properties of the gradientially-intensified reflector field regions disposed thereat. For a detailed explanation of the manner in which gradientially-intensified field regions reflect charged particles, reference may be had to the copending application of Richard F. Post, Serial No. 443,447.

In order to continuously impart energy or kinetically heat the plasma particles, particularly the ions, there is provided means for generating an azimuthal radio frequency electric field within the central region of envelope 11 corresponding to the central region of the magnetic field. In accordance with the salient aspects of the present invention, the radio frequency field means comprises the output tank coil of a radio frequency driver in order that maximum transfer of energy is obtained. More specifically, a resonant solenoidal coil 36 is best provided as a single turn loop formed of flat copper strip so as to have an extremely high current carrying capacity, although various equivalents may also be employed. Coil 36 is disposed concentrically about the central section of envelope 11 fabricated from insulating material intermediate solenoids 32, 33. Coil 36 is rigidly mounted within a hollow concentrically enclosing electrically conducting shield case 37 having a communicating cubical portion 38 projecting radially outward therefrom. The depending end walls of shield case 37 are secured to the envelope 11 in order to retain the case in concentric position thereabout. The coil 36 is in turn supported by rigid electrically conducting connection of one end of the single turn loop to a vertically disposed grounding plate 39 attached in spaced relation to one side wall of cubical portion 38 as by means of electrically conducting stand-off spacers 41. The other end of the single turn coil 36 is rigidly secured in electrically conducting relation to a high voltage plate 42 vertically disposed within cubical portion 38 parallel to plate 39 and spaced from the case walls. A plurality of capacitors 43 are secured between ground plate 39 and high voltage plate 42 and hence provide rigid support for the latter plate as well as form a resonant tank circuit with coil 36. In order that the tank circuit may be readily energized, a coaxial transmission line 44 is provided with the center conductor thereof extending through an aperture 46 in the top of cubical portion 38 and connected to the high voltage plate 42. The outer grounded shield of transmission line 44 is connected to portion 38 of case 37 to thereby provide a closed conduction path. It will be appreciated, however, that the center conductor of transmission line 44 may as well be connected to the center of coil 36 in order to provide a step-up of voltage between the ends of the coil.

Figure 3:
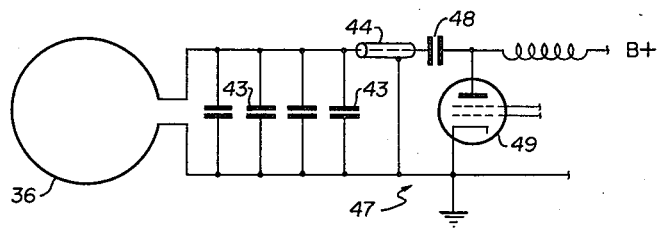
Figure 3 is a schematic diagram of the equivalent circuit of the induced radio frequency field generating structure of this embodiment and preferred means for energizing same.

The transmission line 44 is connected to a radio frequency driver 47 such that the tank circuit comprising coil 36 and capacitors 43 is integrally included as the output tank of the driver. As depicted in Figure 3 wherein an equivalent schematic circuit diagram of the tank circuit as employed in driver 47 is shown, the center conductor of transmission line 44 is coupled by a series capacitor 48 to the plate of a high power output amplifier tube 49 of driver 47. The cathode of amplifier tube 49 is connected to ground and the other elements of the tube are connected in conventional fashion as a driver amplifier and are accordingly not detailed herein nor depicted in the drawing. For the purposes of the present disclosure, it suffices to state that the driver 47 excites its output tank circuit at the resonant frequency thereof and the time varying tank current flowing in coil 36 induces an azimuthal radio frequency electric field at such resonant frequency within the central region of envelope 11 and with optimum efficiency of energy transfer.

It will be appreciated that in a coil such as single turn coil 36, the electrical potential varies from point to point around the loop at any particular instance in time. Such potential gradient would normally establish lamellar electric fields across the space within the central region of envelope 11. These lamellar electric fields would tend to cancel the effect of the induced azimuthal electric field or at least seriously influence the heating action of same upon the plasma. Hence, to overcome the unwanted lamellar fields, the present invention provides a cylindrical squirrel cage Faraday shield 51 which is disposed between coil 36 and the outer surface of envelope 11. More particularly, the Faraday shield 51 is preferably formed of a plurality of axially elongated circumferentially spaced conductors 52 secured at one end to one of the end walls of grounded shield case 37. The opposite ends of the conductors 52 are best secured to an annular insulator 53 which is concentrically mounted between the bore edge of the opposite end wall of case 37 and the periphery of envelope 11. Faraday shield 51 is effective in minimizing the lamellar electric fields in the envelope 11 in that the fields are terminated exteriorly thereof upon the ground potential shield.

Considering now the operation of the ion heating apparatus of the present invention in particular detail, gaseous reactant material is first introduced to the envelope 11 through leak 13 and a continuous flow of such material is established through the envelope by pump means 12. The electrodes 14, 16 are energized by D.-C. voltage supply 30 and solenoids 32, 33 by power supply 34 so as to establish an ionizing reflex electron discharge between the cathodes 17, 18 in the manner previously described. The gaseous reactant material is ionized in the electron discharge, thus establishing an intense gaseous discharge with a column of plasma extending axially through the envelope 11. The plasma density is greatest in the central region of the envelope by virtue of the axial constraining properties of the gradientially-intensified reflector field regions established proximate solenoids 32, 33. The gradients of the reflector field regions are not so great, however, that the plasma column and particularly the electrons thereof are completely constrained from the suppressor plates 24, 26, there being relatively lower density plasma regions extending thereto.

With the plasma column established in envelope 11, the resonant output tank circuit of radio frequency driver 47 including coil 36 and capacitors 43 is energized, with the resonant frequency of the tank circuit being preferably selected to equal the cyclotron frequency of the plasma ions. An azimuthal radio frequency electric field at the cyclotron frequency of the plasma ions is thereby induced within envelope 11. Such induced field, moreover, is substantially undistorted by transverse lamellar fields due to the minimizaiton thereof by the squirrel cage Faraday shield 51.

The induced radio frequency field initially imparts rotational energy to the plasma ions with the ions gaining energy each half-cycle of the field and the radii of their orbits progressively increasing in a manner analogous that in a cyclotron. The ions tend to be concentrated in the outer peripheral regions of the envelope while the electrons tend to be concentrated in the central axial regions of same. The foregoing arises by virtue of the substantial difference in the mass of an ion compared to that of an electron and the proportional difference between the orbital radii of these particles in a magnetic field. The plasma would hence normally tend to be radially polarized under the influence of the azimuthal radio frequency field. This polarization would produce an attendant screening of the central axial regions of the plasma from the radio frequency field such that penetration of the plasma by the field would be seriously limited, if not, insignificant. Radial polarization of the plasma, however, is effectively suppressed in the apparatus of the present invention by means of the suppressor plates 24, 26 of the electrodes 14, 16, respectively. More particularly, a portion of the plasma electrons migrate axially through the plasma column and flow out of same to the suppressor plates 24, 26 at radii where the positive density is decreasing. Such electrons then flow radially through the conducting plates and across the magnetic field lines to radii where the positive density is increasing whereat the electrons leave the plates and re-enter the plasma. Such introduction of electron currents in the outer positively charged regions of the plasma column have been found in practice to effectively neutralize the charge and hence suppress the radial polarization of the plasma. In the apparatus of the present invention, the azimuthal radio frequency field is consequently able to continuously significantly penetrate the plasma and materially increase the energy of or kinetically heat the plasma ions to proportions heretofore unobtainable. The high energy ions are able to undergo various nuclear and chemical reactions at substantial reaction rates by virtue of the high temperatures established by the radio frequency field. The reaction products formed by ion combinations are neutral and therefore free to diffuse from the magnetic field. The reaction products may hence be collected upon collecting blankets or other suitable means (not shown) disposed peripherally within the central region of the envelope.

It will be appreciated that the heated ions and electrons comprising a high energy plasma may be periodically expelled from the envelope 11 for introduction to various plasma utilization apparatus. To accomplish the foregoing, one of the end closures of the envelope is modified to include a plasma egress opening and means for periodically diminishing the strength of the magnetic reflector field region at the corresponding end of the envelope. An annular opening may be, for example, provided in the closure plate supporting electrode 16 spaced radially outward from sleeve 23. In addition, the solenoid 33 may be separately energized with current which is cyclically decreased at a slow repetition rate. Plasma may be hence constrained by the magnetic field in the central region of envelope 11 for a time sufficient for the radio frequency field to materially increase the plasma energy. The reflector field region effected by solenoid 33 is then diminished such that the high energy plasma diffuses out of the egress opening for use in the plasma utilizing apparatus. The foregoing cycle is thereafter repetitiously repeated. The high energy plasma ions may alternatively be extracted from the plasma by suitable ion extraction structure of a conventional nature for introduction to ion utilizing apparatus.

While the invention has been disclosed with respect to a single preferred embodiment, it will be apparent to those skilled in the art that numerous variations and modifications may be made within the spirit and scope of the invention, and thus it is not intended to limit the invention except as defined in the following claims.

What is claimed is:

1. Apparatus for the heating of a plasma comprising an elongated envelope enclosing a low pressure region, a pair of axially spaced direct current energized solenoids respectively disposed about the end regions of said envelope for generating an axially symmetric magnetic field extending through said envelope and having axially spaced gradientially-intensified regions proximate said solenoids, a pair of axially spaced electrodes disposed within said envelope proximate said solenoids, voltage supply means connected to said electrodes to establish a reflex electron discharge axially through said envelope, means for admitting ionizable gaseous material to said envelope, said material being ionized therein by said electron discharge to thereby establish a plasma confined by said magnetic field in the region between the reflector field regions thereof, means for generating an azimuthal radio frequency electric field in the central region of said envelope to impart rotational energy to said plasma, and means including said electrodes to suppress radial polarization of the plasma whereby the radio frequency field significantly penetrates the plasma.

2. Apparatus for the cyclotron resonance heating of plasma ions comprising an elongated cylindrical envelope enclosing a low pressure region, a pair of axially spaced direct current energized solenoids respectively disposed about the end regions of said envelope for generating an axially symmetric magnetic field extending through said envelope and having axially spaced gradientially-intensified reflector field regions proximate said solenoids, a pair of axially spaced electrodes disposed within said envelope in said reflector field regions, voltage supply means connected to the electrodes to establish a reflex electron discharge axially through said envelope, means for admitting ionizable gaseous material to said envelope, said material being ionized therein by said electron discharge to thereby establish a plasma confined by said magnetic field in the region between the reflector field regions thereof, a radio frequency driver tuned to the cyclotron frequency of the plasma ions and having a resonant output tank circuit with the coil thereof concentrically disposed about the central region of said envelope between the solenoids, said coil thereby inducing an azimuthal radio frequency electric field in said plasma at the cyclotron frequency of the plasma ions and imparting energy thereto, electrostatic field shielding means disposed concentrically about the central region of said envelope between the outer peripheral surface thereof and said coil to minimize lamellar electric fields across the central region of the envelope, and electron current bridge means disposed within said reflector field regions transversely of said envelope to receive electrons from said plasma at radii where the positive density thereof is decreasing and introducing said electrons to the plasma at radii where the positive density is increasing.

3. Ion heating apparatus comprising an elongated cylindrical envelope enclosing a low pressure region, a pair of axially spaced direct current energized solenoids respectively disposed concentrically about the end regions of the envelope for generating an axially symmetric magnetic field extending through said envelope and having axially spaced gradientially-intensified reflector field regions proximate said solenoids, axially spaced cathodes respectively disposed within said reflector field regions, a pair of rigid lead-in conductors respectively secured to said cathodes and extending exteriorly of the envelope, a pair of elongated sleeves coaxially disposed about said lead-in conductors and insulated therefrom, said sleeves axially extending exteriorly of the envelope from locations spaced axially outward from said cathodes and electrically connected to ground, a pair of polarization suppressor plates respectively secured transversely to the inner ends of said sleeves and insulated from said lead-in conductors, a direct current power supply having its negative terminal commonly connected to said lead-in conductors and its positive terminal connected to ground to thereby establish a reflex electron discharge axially through said envelope, means for admitting ionizable gaseous material to said envelope, said material being ionized in said electron discharge to thereby establish a plasma confined by said magnetic field in the region between the reflector field regions thereof, and means for generating an azimuthal radio frequency electric field in the central region of said envelope to impart rotational energy to the plasma ions.

4. Ion heating apparatus as defined by claim 3, further defined by said means for generating an azimuthal radio frequency electric field comprising a radio frequency driver tuned to the cyclotron frequency of the plasma ions and having a resonant output tank circuit with the coil thereof concentrically disposed about the central region of said envelope between said solenoids.

5. Apparatus for the heating of a plasma comprising an elongated cylindrical envelope enclosing a low pressure region, at least the central portion of said envelope fabricated from insulating material, a pair of axially spaced direct current energized solenoids respectively disposed concentrically about the end regions of the envelope on opposite sides of the insulated central portion thereof, said solenoids generating an axially symmetric magnetic field extending through said envelope and having axially spaced gradientially-intensified reflector field regions of peak intensity at the transverse median planes of said solenoids, a ring cathode transversely disposed within one of said reflector field regions axially inward from the median plane of the corresponding solenoid, a field emitting disc cathode transversely disposed within the other of said reflector field regions axially inward from the median plane of the corresponding solenoid, a pair of rigid lead-in conductors respectively secured to said cathodes and extending axially outward therefrom externally through the end walls of the envelope, a pair of elongated electrically conducting sleeves respectively disposed coaxially about said lead-in conductors and insulated therefrom, said sleeves extending through the end walls of said envelope from locations spaced axially outward from the median planes of said solenoids, said sleeves connected to ground, a pair of electrically conducting polarization suppressor plates transversely secured to the inner ends of said sleeves in electrically conducting relation thereto, and insulated from said lead-in conductors, a pair of electrically conducting cooled tubular members coaxially secured within the end regions of said envelope and connected to ground, a direct current power supply having its negative terminal commonly connected to said lead-in conductors and its positive terminal connected to ground, a single turn coil disposed concentrically about the insulated central region of said envelope, a hollow electrically conducting shield case mounted upon said envelope and concentrically enclosing said coil, said shield case having a communicating radially outward projecting cubical portion, a grounding plate conductively attached to one side wall of said cubical portion in spaced relation thereto, said grounding plate conductively attached to one end of said coil, a high voltage plate disposed within said cubical portion in parallel spaced relation to said grounding plate and spaced from the case walls, said high voltage plate conductively attached to the other end of said coil, a plurality of capacitors conductively secured between said ground and high voltage plates to form a resonant tank circuit with said coil, a coaxial transmission line having its center conductor connected to said high voltage plate and its outer conductor connected to the cubical portion of said shield, a radio frequency driver including at least a high power output amplifier tube, means coupling said transmission line to said tube to couple the tank circuit formed by said coil and capacitors in integral circuit therewith as the output tank circuit of said driver, and a squirrel cage Faraday shield disposed concentrically about the central region of said envelope between the outer peripheral surface thereof and said coil, said shield conductively attached to one of the end walls of said shield case.

References Cited in the file of this patent
UNITED STATES PATENTS 2,831,996  Martina _____ Apr. 22, 1958
2,892,114  Kilpatrick _____ June 23, 1959